United States Patent
Bailey et al.

(10) Patent No.: US 7,936,675 B2
(45) Date of Patent: May 3, 2011

(54) BANDWIDTH PACKING RATE CONTROLLER FOR OPTIMIZING RESOURCE UTILIZATION

(75) Inventors: Leigh Bailey, Chippenham (GB); Ching-Roung Chou, Naperville, IL (US); Choon Kwang Goh, Swindon (GB); Nidal N. Khrais, Flander, NJ (US); Gopal N. Kumar, Bridgewater, NJ (US); Alan C. Paddock, Chippenham (GB); Anthony E. Putman, Chippenham (GB); Yalou Wang, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 468 days.

(21) Appl. No.: 11/565,772

(22) Filed: Dec. 1, 2006

(65) Prior Publication Data
US 2008/0130501 A1    Jun. 5, 2008

(51) Int. Cl.
*H04L 12/28*    (2006.01)
(52) U.S. Cl. ........ 370/232; 370/229; 370/230; 709/223; 709/226
(58) Field of Classification Search ............ 370/229, 370/230, 232; 714/699, 746, 752, 774; 709/223, 709/226, 230, 233, 238
See application file for complete search history.

(56) References Cited

U.S. PATENT DOCUMENTS

| | | | |
|---|---|---|---|
| 5,799,002 A * | 8/1998 | Krishnan | 370/234 |
| 6,981,052 B1 * | 12/2005 | Cheriton | 709/232 |
| 6,985,442 B1 * | 1/2006 | Wang et al. | 370/232 |
| 7,426,181 B1 * | 9/2008 | Feroz et al. | 370/232 |
| 2002/0150044 A1 * | 10/2002 | Wu et al. | 370/229 |
| 2002/0199012 A1 * | 12/2002 | Cable et al. | 709/233 |
| 2003/0235209 A1 * | 12/2003 | Garg et al. | 370/468 |
| 2004/0158644 A1 * | 8/2004 | Albuquerque et al. | 709/238 |
| 2005/0169186 A1 * | 8/2005 | Qiu et al. | 370/242 |
| 2006/0088058 A1 * | 4/2006 | Eckert et al. | 370/469 |
| 2006/0245355 A1 * | 11/2006 | Iwamura | 370/232 |
| 2006/0268764 A1 * | 11/2006 | Harris | 370/328 |
| 2007/0220403 A1 * | 9/2007 | Allen | 714/774 |
| 2008/0101354 A1 * | 5/2008 | Arndt | 370/389 |

* cited by examiner

*Primary Examiner* — William Trost, IV
*Assistant Examiner* — Charles C Jiang
(74) *Attorney, Agent, or Firm* — Carlson, Gaskey & Olds

(57) ABSTRACT

A bandwidth packing rate control technique includes altering bandwidth allocations of existing flows on a link depending on a current utilization of a current bandwidth allocation for a flow. A disclosed example decreases the bandwidth allocation for flows that are utilizing a current bandwidth allocation below a selected target utilization rate. Flows with higher utilization can receive increased bandwidth allocation, which provides increased throughput for such flows. One overall result of a disclosed example is increased utilization and increased throughput using existing bandwidth resources.

19 Claims, 2 Drawing Sheets

BANDWIDTH PACKING RATE CONTROLLER FOR OPTIMIZING RESOURCE UTILIZATION

FIELD OF THE INVENTION

This invention relates to communications. More particularly, this invention relates to rate control for communications.

DESCRIPTION OF THE RELATED ART

Various communication systems are known. Wireless communication systems, for example, utilize a variety of links between equipment associated with a wireless communication network. One aspect of using such links is managing the resources of the link to achieve desired communication capabilities.

For example, in wireless communication systems base stations are geographically positioned to provide wireless coverage over desired areas or regions. The base station equipment communicates over a dedicated link, often including fiber optic cable, with other network components. In some examples, base stations communicate directly with a radio network controller over a link called the Iub interface. Managing the use of the resources on such a link typically includes a strategy for achieving a desired throughput or capacity along that link.

One technique includes over-subscribing the available bandwidth to exploit efficiencies that are associated with statistical multiplexing. Over-subscription is one technique that attempts to achieve higher throughput without altering the infrastructure that provides the available bandwidth. For over-subscription to work, however, an appropriate rate controlling mechanism is required to stabilize the over-subscribed flows within the capacity of the corresponding link. Stabilization has been a consideration in existing rate control mechanisms.

For example, one stabilization technique includes making sure that the over-subscribed flows along a link do not exceed the bandwidth capacity of the link. A reduction factor may be imposed upon the flows without any consideration of the underlying flow characteristics. The reduction factor was typically applied across the board, whenever a reduction was determined to be necessary or beneficial. One drawback associated with this technique is that it potentially results in poor resource utilization, which ultimately reduces the overall throughput of the system. This negates or at least counteracts any efficiencies obtained by the over-subscription technique.

There is a need for a technique that allows for increasing throughput without requiring changes to the infrastructure associated with currently available resources. In other words, a technique for better using available bandwidth is desirable so that additional investment need not be made for increasing available bandwidth by implementing new or additional resources. There is a need for optimizing use of the already available resources.

This invention addresses such needs and avoids the shortcomings and drawbacks mentioned above.

SUMMARY OF THE INVENTION

An exemplary method of communicating includes altering a bandwidth allocation for a flow if the flow utilization of the bandwidth allocation differs from a selected target utilization. One example method essentially takes some of the bandwidth allocation from a flow that is not utilizing its allocation at a desired level and transfers at least some of that to another flow that is more efficiently utilizing its own current bandwidth allocation. By transferring bandwidth allocation among flows, a target utilization rate for a plurality of flows can be achieved.

One example includes controlling an amount that the bandwidth allocation is altered to maintain flow utilization approximately equal to a selected target utilization. One example includes an approach for determining an amount of bandwidth allocation change that will facilitate keeping the bandwidth utilization within a desired range.

The various features and advantages of this invention will become apparent to those skilled in the art from the following detailed description. The drawings that accompany the detailed description can be briefly described as follows.

DETAILED DESCRIPTION

A disclosed example implementation of this invention includes selectively altering bandwidth allocation among a plurality of flows such that the utilization of the bandwidth allocations approaches a selected target utilization. One example includes decreasing the bandwidth allocation of a flow that is not utilizing its current allocation in an amount corresponding to the target utilization. Other flows that are more effectively utilizing their current bandwidth allocation may receive a higher bandwidth allocation. The net result is better utilization of the available resources (e.g., bandwidth) and higher throughput.

Figure 1:
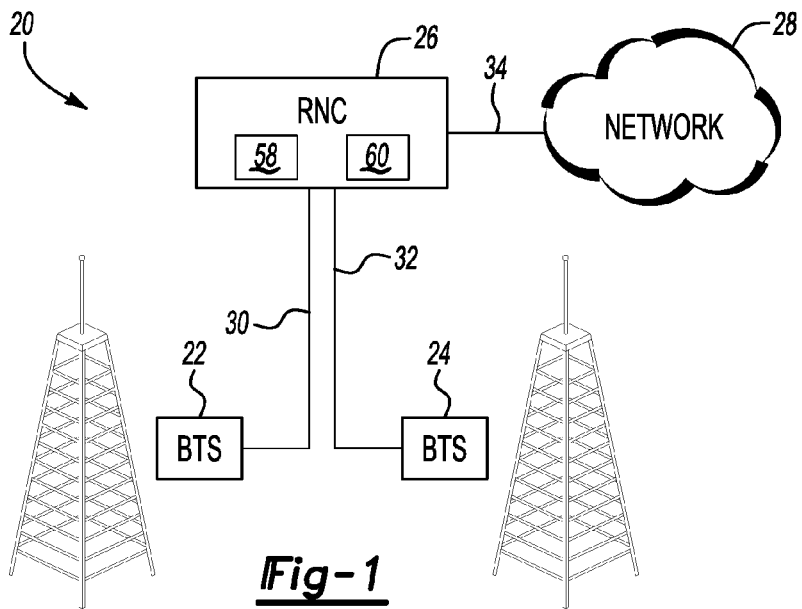
FIG. 1 schematically illustrates selected portions of a communication system that is useful with an embodiment of this invention.

FIG. 1 schematically shows selected portions of a communication system 20. In this example, a UTRAN, UMTS radio access network is shown. Such a network is used for discussion purposes and to explain how an implementation of this invention can be useful within one example communication system. The illustrated system 20 includes a plurality of base stations 22 and 24 that are strategically positioned to provide wireless communication service in corresponding areas. Each of the base stations 22 and 24 communicate with a radio network controller (RNC) 26, which communicates with a network 28.

The illustration includes a communication link 30 between the base station 22 and the RNC 26 and another link 32 between the base station 24 and the RNC 26. In one example, the links 30 and 32 each comprise an Iub interface. Another communication link 34 couples the RNC 26 to the network 28 in a known manner.

Managing the use of the capacity or resources (e.g., bandwidth) provided by the communication links includes a strategy for optimizing utilization of those resources. For purposes of discussion, an assumption that an over-subscription technique is being employed is included. Given this description, those skilled in the art will appreciate how an implementation of this invention will be useful on a particular type of communication link or in connection with other scheduling or resource allocation techniques.

Figure 2:
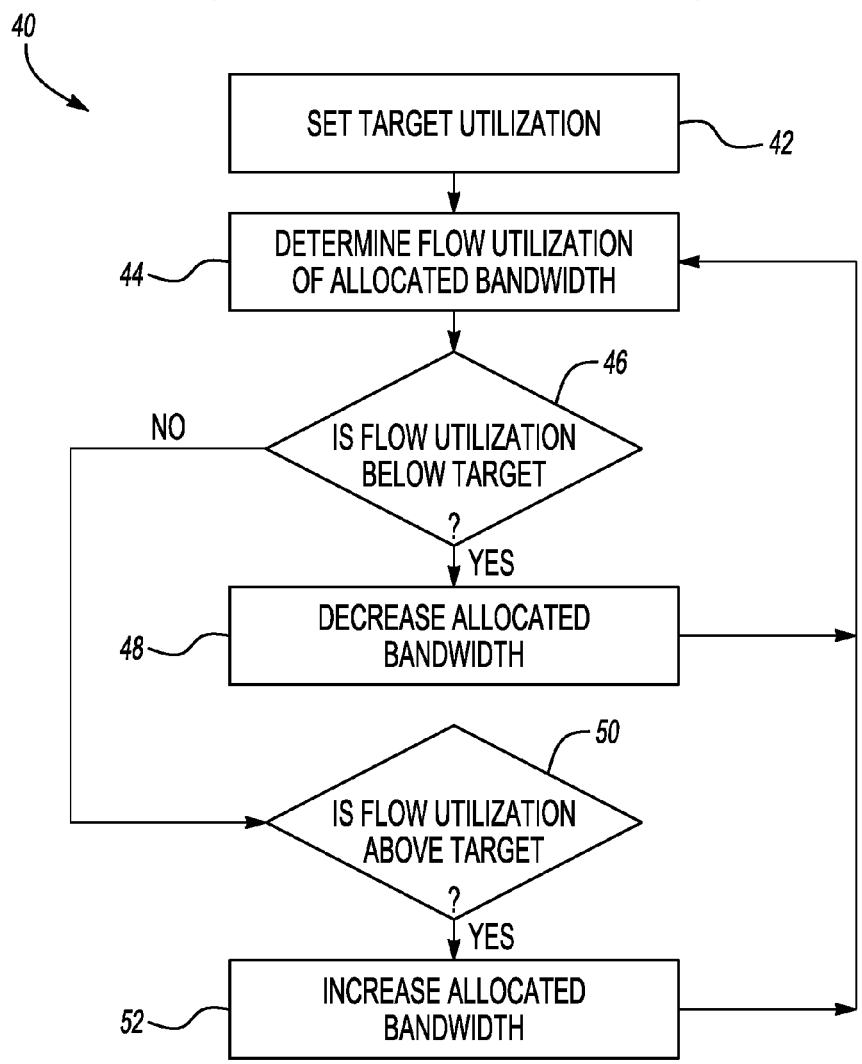
FIG. 2 is a flowchart diagram summarizing one example approach.

FIG. 2 includes a flowchart diagram 40 that summarizes one example approach. This example begins at 42 where a target utilization T is set. Target utilization will vary depending on the needs of a particular situation. For purposes of discussion, an 80% utilization rate (i.e., a flow is actually using or occupying 80% of the amount of bandwidth allocated to it) is an example target utilization.

When a flow is first admitted in one example, an initial bandwidth allocation is provided to that flow based upon a flow admission technique. That allocation typically will follow a control technique that ensures against overflow on a particular link. At 44, the flow utilization of the bandwidth allocation to at least one flow is determined. In examples where a plurality of flows are active on a link, this determination will be made for each active flow. At 46, a determination is made whether the flow utilization is below the set target. If so, the example of FIG. 2 continues at 48 where the allocated bandwidth for that flow is decreased. If the flow utilization is not below the target, then the process continues at 50 to confirm that the flow utilization is above the target. If so, the allocated bandwidth for that flow is increased at 52. The process then continues at 44 to determine the flow utilization based on the current bandwidth allocation and the current behavior of a particular flow. Given this description, those skilled in the art will be able to select an appropriate frequency for making the determination of a flow utilization and comparing that to the target utilization. The time period during which a current bandwidth allocation will be maintained can be varied depending on a particular system arrangement or traffic conditions, for example.

In one example, any bandwidth that is taken from the allocation to a flow having a low bandwidth utilization can be allocated to another flow with higher utilization. In some instances, it will be advantageous to take bandwidth allocation from a flow having a relatively low utilization and keep that removed bandwidth in a bandwidth storage 60, for example, so that it can be later allocated to an existing flow. In one example, the bandwidth storage is not used as part of a call or flow admission process, but only is used for purposes of reallocating bandwidth among existing flows. With such a bandwidth storage when a flow has a high utilization rate that warrants an increased bandwidth allocation to that flow, some of the bandwidth allocated to another, lower utilizing flow can be taken or some of the bandwidth from the bandwidth storage may be used and allocated to the flow having the higher utilization.

In one example, adjusting the bandwidth allocation includes several considerations that are intended to optimize the use of the available resources. Decreasing the bandwidth allocation for a flow that is utilizing its current allocation at a relatively low rate will improve the utilization for such a flow. Increasing the bandwidth allocation for a flow that has a high utilization rate will improve the throughput for such a flow. It is important to note, however, that merely increasing bandwidth will not necessarily provide an optimal solution. Increasing bandwidth, for example, does not increase utilization. If a flow characteristic does not change and more bandwidth is allocated to that flow, that flow will be utilizing less of its allocated bandwidth, for example. The disclosed example intends to optimize utilization and, therefore, includes a strategy for determining how much to change or alter a bandwidth allocation for a particular flow.

One factor that is considered in one example is that transfer control protocol (TCP) governed flows adapt to available bandwidth. The impact of a bandwidth allocation change on the TCP behavior therefore is a useful metric to employ. This ensures obtaining more benefit from parameter optimization.

For example, TCP typically reacts to round trip delay and loss probability. The round trip delay will vary depending on the available bandwidth. Therefore, blindly altering bandwidth allocations may not be advisable for at least some situations.

Determining a current utilization in one example includes measuring the buffer length at an appropriate position along a communication link such as at the RNC 26, which has a buffer 58. The buffer length or buffer occupancy can be expressed as an average number of packets waiting in the buffer. That information allows for determining a current utilization of the bandwidth allocation for a flow being serviced by that buffer. Utilization can be defined by the equation $$\rho = \frac{\lambda}{\sigma} \quad (1)$$

where β is the utilization, λ is an arrival rate and σ is a service rate. Because the buffer occupancy (BO) can be expressed using the following equation:

$$BO = \frac{\rho}{(1-\rho)} \quad (2)$$

it is possible to determine a current utilization based upon a determined buffer occupancy using the following equation:

$$\rho = \frac{BO}{1+BO} \quad (3)$$

Figure 2A:
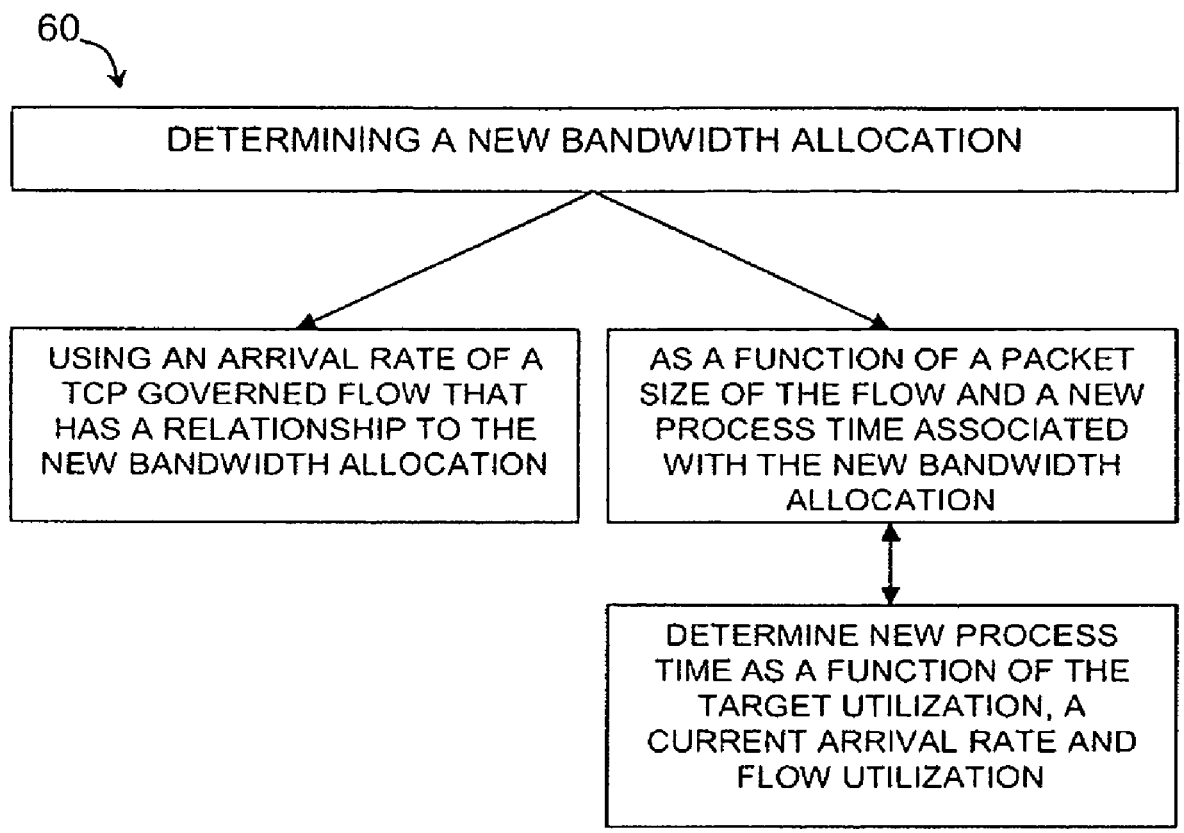
FIG. 2A is a flowchart diagram regarding an example approach.

In one example, a target utilization is set having a value T (e.g., T=80%). If a flow utilization is lower than T, then the bandwidth allocation for that flow will be reduced. One challenge is that the TCP governing a particular flow will see a resulting increase in the round trip time and therefore shrink its window responsive to the bandwidth allocation. In the case of an increased bandwidth allocation, the TCP will see a decrease in the round trip time and will enlarge its window. Therefore, this example includes considering the effect of the round trip time on the TCP send rate for purposes of maximizing the utilization of a bandwidth on the link. One example is summarized in the flowchart diagram 60 of FIG. 2A. The following relationship, which is a well known equation, between the arrival rate λ and round trip time (RTT) is true $$\lambda = \left(\frac{1}{RTT}\right)\sqrt{\frac{3}{2bp}} \quad (4)$$

where p is the loss probability and b is a number of packets acknowledged by a received ACK. The loss probability p is unchanged by reducing the bandwidth allocation for a flow. It follows that a first arrival rate $\lambda_1$ has a relationship to a second arrival rate $\lambda_2$ for the same flow $$\frac{\lambda_2}{\lambda_1} = \frac{RTT_1}{RTT_2} \Rightarrow \lambda_2 = \left(\frac{RTT_1}{RTT_2}\right)\lambda_1 \quad (5)$$

In most cases, the factor by which RTT is changed is determined by the change in the wait time W resulting from the change in bandwidth. Wait time W can be expressed as $$W = \frac{TP}{(1-\rho)} \quad (6)$$

where TP is the processing time for a single packet. The relationship between a wait time using a current bandwidth allocation $W_1$ and a wait time for a new bandwidth allocation $W_2$ can be expressed as $$\frac{W1}{W2} = \left(\frac{TP1}{TP2}\right)\left(\frac{1-\rho_2}{1-\rho_1}\right). \quad (7)$$

From the known Ching-Roung's Ping model, it is known that RTT1=C+W1; and RTT2=C+W2, where C is from Ching-Roung's Ping Model.

A relationship between the round trip times associated with a current bandwidth allocation and a new bandwidth allocation can be described as $$\frac{RTT1}{RTT2} = \frac{C+W1}{C+W2} = \frac{C+A*TP1}{C+B*TP2} \quad (8)$$

where $$A = \frac{1}{1-\rho_1}; B = \frac{1}{1-\rho_2}.$$

For a situation where the new utilization $\rho_2$ is intended to be the target utilization, $\rho_2$ should be set so that $\rho_2$=T.

$$\text{Now } \frac{\lambda_2}{\lambda_1} = \frac{RTT1}{RTT2} \Rightarrow \lambda_2$$
$$= \left(\frac{RTT1}{RTT2}\right)\lambda_1 \text{ and } \frac{RTT1}{RTT2}$$
$$= \frac{C+W1}{C+W2}$$
$$= \frac{C+A*TP1}{C+B*TP2}$$

provide the following relationship:

$$\lambda_2 = \left(\frac{C+A*TP1}{C+B*TP2}\right)\lambda_1 \quad (9)$$

for the new bandwidth allocation. Given the target utilization T, it is true that $$\frac{\lambda_2}{\sigma_2} = T \quad (10)$$

The service rate $\rho_2$ is related to the process time associated with the new bandwidth allocation as shown by the relationship $$\sigma_2 = \frac{1}{TP2}.$$

Substituting into $$\lambda_2 = \left(\frac{C+A*TP1}{C+B*TP2}\right)\lambda_1,$$

yields $$\lambda_2 = \frac{T}{TP2} = \left(\frac{C+A*TP1}{C+B*TP2}\right)\lambda_1 \quad (11)$$

This can be solved for TP2 as shown by $$TP2 = \frac{T*C}{\lambda_1(C+A*TP1)-B*T} \Rightarrow BW2 = \frac{P}{TP2}$$

The process time TP2 and the known packet size P of a flow provides the new bandwidth allocation BW2 (e.g., equation (11)) where P is the packet size.

One feature of the described example is that it provides the capability to essentially share an aggregate allocation of bandwidth among flows based upon their current utilization to improve overall bandwidth utilization. Another feature of the disclosed example is that it is controlled in a manner that takes into account TCP activity to formulate the amount of adjustment to a bandwidth allocation based upon an explicit model of underlying TCP behavior.

The disclosed example includes several advantages including an expected proportional increase in throughput with existing bandwidth limitations. Improving utilization also improves scalability. Another advantage of the disclosed example is better utilization implies higher throughput for the same amount of bandwidth, which translates into a reduced cost of transmitting each bit. Another advantage is that it is more adaptive to flow behavior because it considers the impact on the flow that the bandwidth adjustment strategy will have. Such a feedback mechanism provides optimal utilization and control.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A method of communicating, comprising
determining an amount of flow utilization of a bandwidth allocation for a flow based on a behavior of the flow, wherein the flow is at least one of transmitted by a communication device or received by a communication device;
altering the bandwidth allocation for the flow to a new bandwidth allocation if the flow utilization of the bandwidth allocation differs from a selected target utilization; and
determining the new bandwidth allocation as a function of a process time and determining the new process time as a function of the target utilization, a current arrival rate and the flow utilization.

2. The method of claim 1, comprising
controlling an amount that the bandwidth is altered to maintain the flow utilization approximately equal to the selected target utilization.
3. The method of claim 1, comprising
decreasing the bandwidth allocation for the flow if the flow utilization is below the target utilization.
4. The method of claim 3, comprising
decreasing the bandwidth allocation in an amount that brings the flow utilization toward the target utilization; and
allocating at least a portion of the decreased amount to another flow.
5. The method of claim 3, comprising
decreasing the bandwidth allocation in an amount that brings the flow utilization toward the target utilization; and
allocating at least a portion of the decreased amount to a bandwidth storage.
6. The method of claim 1, comprising
increasing a bandwidth allocation for the flow if the flow utilization is above the target utilization.
7. The method of claim 6, wherein there is at least one of a second flow that has a second flow utilization that is below the target utilization or a bandwidth storage and comprising
allocating at least some of the bandwidth of the second flow or the bandwidth storage to the flow having the flow utilization above the target utilization.
8. The method of claim 1, comprising
periodically determining the flow utilization of the allocated bandwidth by determining a buffer occupancy level for the flow.
9. The method of claim 1, comprising
determining the new bandwidth allocation using an arrival rate of a TCP governed flow that has a relationship to the new bandwidth allocation.
10. The method of claim 9, comprising
determining the new bandwidth allocation as a function of a packet size of the flow and wherein the new process time is associated with the new bandwidth allocation.
11. The method of claim 1, wherein the allocated bandwidth is a portion of a bandwidth along an Iub interface.
12. A method of communicating, comprising
determining a flow utilization level of bandwidth allocated to a flow, wherein the determination is based on an aspect of traffic behavior attributed to the flow, wherein the flow is transmitted by a communication device, received by a communication device or transmitted and received by a communication device;
altering the bandwidth allocated to the flow if the flow utilization level differs from a target level; and
determining a new bandwidth allocation as a function of a process time and determining the new process time as a function of the target utilization, a current arrival rate and the flow utilization.
13. The method of claim 12, comprising
controlling an amount that the bandwidth is altered to maintain the flow utilization approximately equal to the selected target utilization.
14. The method of claim 12, comprising
decreasing the bandwidth allocation for the flow if the flow utilization is below the target utilization including decreasing the bandwidth allocation in an amount that brings the flow utilization toward the target utilization; and
allocating at least a portion of the decreased amount to another flow or to a bandwidth storage.
15. The method of claim 12, comprising
increasing a bandwidth allocation for the flow if the flow utilization is above the target utilization.
16. The method of claim 15, wherein there is at least one of a second flow that has a second flow utilization that is below the target utilization or a bandwidth storage and comprising
allocating at least some of the bandwidth of the second flow or the bandwidth storage to the flow having the flow utilization above the target utilization.
17. The method of claim 12, comprising
periodically determining the flow utilization of the allocated bandwidth by determining a buffer occupancy level for the flow.
18. The method of claim 12, comprising
determining the new bandwidth allocation using an arrival rate of a TCP governed flow that has a relationship to the new bandwidth allocation.
19. The method of claim 18, comprising
determining the new bandwidth allocation as a function of a packet size of the flow and wherein the new process time is associated with the new bandwidth allocation.

* * * * *